United States Patent
Trovato

(10) Patent No.: US 6,701,526 B1
(45) Date of Patent: Mar. 2, 2004

(54) METHOD AND APPARATUS FOR CAPTURING BROADCAST EPG DATA FOR PROGRAM TITLE DISPLAY

(75) Inventor: Karen I. Trovato, Putnam Valley, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/345,338

(22) Filed: Jul. 1, 1999

(51) Int. Cl.[7] .......................... G06F 3/00; G06F 13/00; H04N 5/445
(52) U.S. Cl. ......................................... 725/39; 348/563
(58) Field of Search .............................. 725/39, 47, 52, 725/53; 348/563, 569; 345/825, 784; 382/159

(56) References Cited

U.S. PATENT DOCUMENTS

| | | | |
|---|---|---|---|
| 5,557,338 A | * 9/1996 | Maze et al. | 725/38 |
| 5,589,892 A | 12/1996 | Knee et al. | 348/731 |
| 5,805,235 A | * 9/1998 | Bedard | 725/38 |
| 5,852,474 A | * 12/1998 | Nakagaki et al. | 348/564 |
| 5,892,498 A | * 4/1999 | Marshall et al. | 345/684 |
| 5,917,481 A | * 6/1999 | Rzeszewski et al. | 345/721 |
| 5,986,650 A | * 11/1999 | Ellis et al. | 725/40 |
| 6,020,930 A | * 2/2000 | Legrand | 725/41 |
| 6,097,441 A | * 8/2000 | Allport | 348/552 |
| 6,130,726 A | * 10/2000 | Darbee et al. | 348/734 |
| 6,212,680 B1 | * 4/2001 | Tsinberg et al. | 725/39 |
| 6,337,719 B1 | * 1/2002 | Cuccia | 348/731 |
| 6,405,372 B1 | * 6/2002 | Kim et al. | 725/50 |
| 6,564,379 B1 | * 5/2003 | Knudson et al. | 725/42 |

FOREIGN PATENT DOCUMENTS

| | | | |
|---|---|---|---|
| EP | 0840511 A1 | 3/1997 | H04N/7/16 |
| EP | 0848554 A2 | 12/1997 | H04N/7/173 |

* cited by examiner

Primary Examiner—John Miller
Assistant Examiner—Scott Beliveau

(57) ABSTRACT

A method for providing programming information to a viewer. The method includes steps of capturing an image of a broadcast video signal that includes EPG data; extracting programming information from the captured image; storing the extracted programming information; retrieving the stored programming information, including at least a program title that identifies a current program being carried on a channel selected by the viewer; and, displaying both the current program carried on the selected channel and the retrieved programming information on a video display. The capturing, extracting, and storing steps are performed periodically in order to regularly update the stored programming information. Preferably, the displaying step is performed by displaying the retrieved programming information in overlaying relationship to the current program, and is discontinued upon the lapse of a prescribed time period. In one embodiment, the retrieving and displaying steps are performed in response to the viewer changing channels, each time that the viewer changes channels when channel surfing. Also disclosed are an apparatus and television system for performing the above-described method.

2 Claims, 2 Drawing Sheets

METHOD AND APPARATUS FOR CAPTURING BROADCAST EPG DATA FOR PROGRAM TITLE DISPLAY

BACKGROUND OF THE INVENTION

The present invention relates generally to television systems, and more particularly, to a method and apparatus for capturing broadcast Electronic Program Guide (EPG) data and for displaying program titles on the television screen as the viewer changes channels, using the captured EPG data.

Electronic Program Guides (EPGs) for television systems are currently in widespread use. In general, EPG systems provide program schedule information indicating the title of the broadcast program currently being aired or scheduled to be aired on each available channel for a given window of time (e.g., for a one-hour window), and the scheduled run times for each broadcast program scheduled to air during the given window of time. The program schedule information is presented or displayed in a variety of different formats, the most prevalent being a matrix presentation format, such as the one depicted in FIG. 1, wherein the channels (or station IDs) are listed in a separate (left-hand) column (i.e., as row headers), the starting times for the listed programs provided as column headers in a separate row at the top of the display, and the program titles being listed in rows next to the channel on which they are scheduled to run under the appropriate column (run time) headers.

Most presently known EPGs are broadcast over a separate (dedicated) satellite or cable channel, and can only be viewed by tuning to that channel. Thus, when a viewer desires to consult the EPG to find out what program is playing on one or more different channels at a particular time(s), the viewer must switch to the EPG channel, and then view the EPG displayed on that channel. However, the EPG is typically provided as a slow-scrolling display, thereby requiring the viewer to wait until the display "reaches" the channel(s) and time period of interest to him or her. This process is cumbersome and inconvenient, and does not fully take into account the normal viewing habits of the typical television user. More particularly, viewers typically navigate through different channels of interest in order to ascertain what programs are currently being run on these channels by skimming or "surfing" through these channels with the aid of a remote control device (remote controller), a practice commonly referred to as "channel surfing". However, as the viewer surfs through the different channels, he or she needs to guess which program is currently being aired on a particular channel on the basis of whatever video is being displayed at the moment in time that the viewer tunes into that particular channel. Moreover, since a significant percentage (e.g., 30%) of the programming that will be encountered as the viewer rapidly surfs through the different channels is advertising, the viewer is not provided with even a clue as to what program is currently airing on those channels on which an advertisement is encountered. Therefore, the viewer is left with the choice of either skipping over all channels on which he or she encounters an advertisement, or waiting until the advertisement(s) is over and the program returns.

A few solutions to the above-described problem have been proposed. One proposed solution is an interactive EPG service that allows the viewer to transmit specific requests for program schedule information via a back-channel (i.e., up-link). However, such interactive EPG systems are complex and expensive to implement, and present other problems such as wiring difficulties, bandwidth constraints, and personal data security concerns. In short, interactive EPG systems are undesirable or impractical for most consumer television systems in use today.

Another solution that has been proposed is disclosed in U.S. Pat. No. 5,589,892, issued to Knee et al., the disclosure of which is fully incorporated herein by reference, for all purposes. The '892 patent discloses an EPG system that displays current programming information for each channel that is encountered as the viewer surfs through the channels of interest, on a real-time basis. A data processor in the television receiver and/or the set-top box stores in a local memory television program schedule information for a plurality of television programs received from an EPG data feed. A user control apparatus, such as a remote controller, is utilized by the viewer to select user control commands for transmission to the data processor. A video display generator receives video control commands from the data processor, and program schedule information from the local memory, and displays pertinent program information (e.g., channel number, start and stop time, and program title) for each given channel in overlaying relationship to the television program being shown on that given channel, as the viewer surfs through the channels, e.g., in a "flip" or "browse" mode of operation. Thus, the data processor controls the video display generator, in response to user control commands (e.g., a "flip" mode activation command), to display program information for any selected channel in overlaying relationship to the television program then appearing on the selected channel, on a real-time basis, as the viewer surfs through the channels of interest.

Although the EPG system disclosed in the '892 patent constitutes a potentially attractive solution to the fundamental problem discussed hereinabove with the presently available EPG systems, it suffers from a fundamental shortcoming. More particularly, the EPG system disclosed in the '892 patent requires a separate EPG data feed that is non-existent in many television systems. Thus, this EPG system simply can not be utilized in any television system which does not receive a separate EPG data feed.

Thus, there presently exists a need in the art for a system for displaying program information for each channel, when desired by a viewer, which overcomes the fundamental shortcoming of the EPG system disclosed in the '892 patent. In other words, what is needed is a system that achieves the functionality of the system disclosed in the '892 patent, but that can be utilized in conjunction with television systems that only receive the broadcast EPG video signal, and that do not receive a separate EPG data feed. The present invention fulfills this need in the art.

SUMMARY OF THE INVENTION

The present invention encompasses, in one of its aspects, a method for providing programming information to a viewer. The method includes steps of capturing an image of a broadcast video signal that includes EPG data; extracting programming information from the captured image; storing the extracted programming information; retrieving at least selected portions of the stored programming information (the retrieved programming information preferably including at least a program title that identifies a current [and/or future] program being carried on a channel selected by the viewer); and, displaying concurrently both the current program carried on the selected channel and the retrieved programming information, on a display. The capturing, extracting, and storing steps are performed periodically in order to regularly update the stored programming information. Preferably, the displaying step is performed by displaying the retrieved programming information in overlaying relationship to the current program, and is discontinued upon the lapse of a prescribed time period. In one embodiment, the retrieving and displaying steps are performed in response to the viewer changing channels, each time that the viewer changes channels when channel surfing.

In another of its aspects, the present invention encompasses an apparatus for performing the method of the present invention. The apparatus can be incorporated into a television set or a television set-top box.

In yet another of its aspects, the present invention encompasses a television system that includes a first tuner; a second tuner that receives a program video signal carried on a channel selected by a viewer; a data processor (e.g., a microprocessor); an image capture module having an input coupled to an output of the first tuner and an output coupled to an input of the microprocessor; a video display generator having a first input coupled to an output of the second tuner and a second input coupled to an output of the microprocessor. The microprocessor is programmed to at least periodically tune the first tuner to an EPG channel that carries a broadcast video signal that includes EPG data, and to periodically control the image capture module to capture an image of the broadcast video signal that includes EPG data. The microprocessor is also programmed to at least periodically extract programming information from the captured image, and to store the extracted programming information. The microprocessor is also programmed to retrieve at least selected portions of the stored programming information (the retrieved programming information preferably including at least a program title that identifies a current [and/or future] program being carried on the channel selected by the viewer), and to supply the retrieved programming information to the video display generator, whereby the video display generator simultaneously displays both the current program carried on the selected channel and the retrieved programming information on a video display. In a disclosed embodiment, the television system is programmed to perform a set-up routine that trains the microprocessor to recognize a presentation format of the EPG data contained in the broadcast video signal received over the EPG channel, and to recognize the locations of different data fields of the EPG data contained in the broadcast video signal received over the EPG channel, whereby the microprocessor uses this location information in extracting the programming information from the captured image.

BRIEF DESCRIPTION OF THE DRAWINGS

The above and other objects, features, and advantages of the present invention will become apparent from the following detailed description read in conjunction with the accompanying drawings, in which.

DETAILED DESCRIPTION OF THE INVENTION

In overview, the present invention overcomes the fundamental shortcoming of the EPG system disclosed in U.S. Pat. No. 5,589,892 by capturing an image of the EPG data from the broadcast video signal received by the television receiver (or cable or satellite set-top box) over the "EPG channel", and then extracting the EPG data from the captured image for storage in a local memory. All or selected portions of the extracted EPG data stored in the local memory can then be retrieved and used, e.g., as it is in the EPG system disclosed in the '892 patent (which is fully incorporated herein by reference), to overlay the EPG data pertinent to any selected channel over the broadcast program video signal for the selected channel, e.g., when the user/viewer invokes an "EPG display" mode of operation, such as the "flip" or "browse" modes of operation disclosed in the '892 patent. Thus, the present invention enables the functionality disclosed in the '892 patent without the requirement that the EPG data be supplied as a digital data stream. In other words, rather than relying upon a digital EPG data feed, the present invention captures an image of the slow-scrolling EPG data from the broadcast EPG video signal, e.g., an image of the slow-scrolling EPG video display that would be seen by a viewer who waited for an entire "cycle" of the slow-scrolling video display. Thus, a novel aspect of the present invention resides in the methodology (and corresponding apparatus) for obtaining the EPG data that is subsequently stored and utilized to display program titles (and other EPG data, if desired) in overlaying relationship to the program video signal for one or more selected channels, e.g., as the user/viewer surfs through the available channels.

Figure 2:
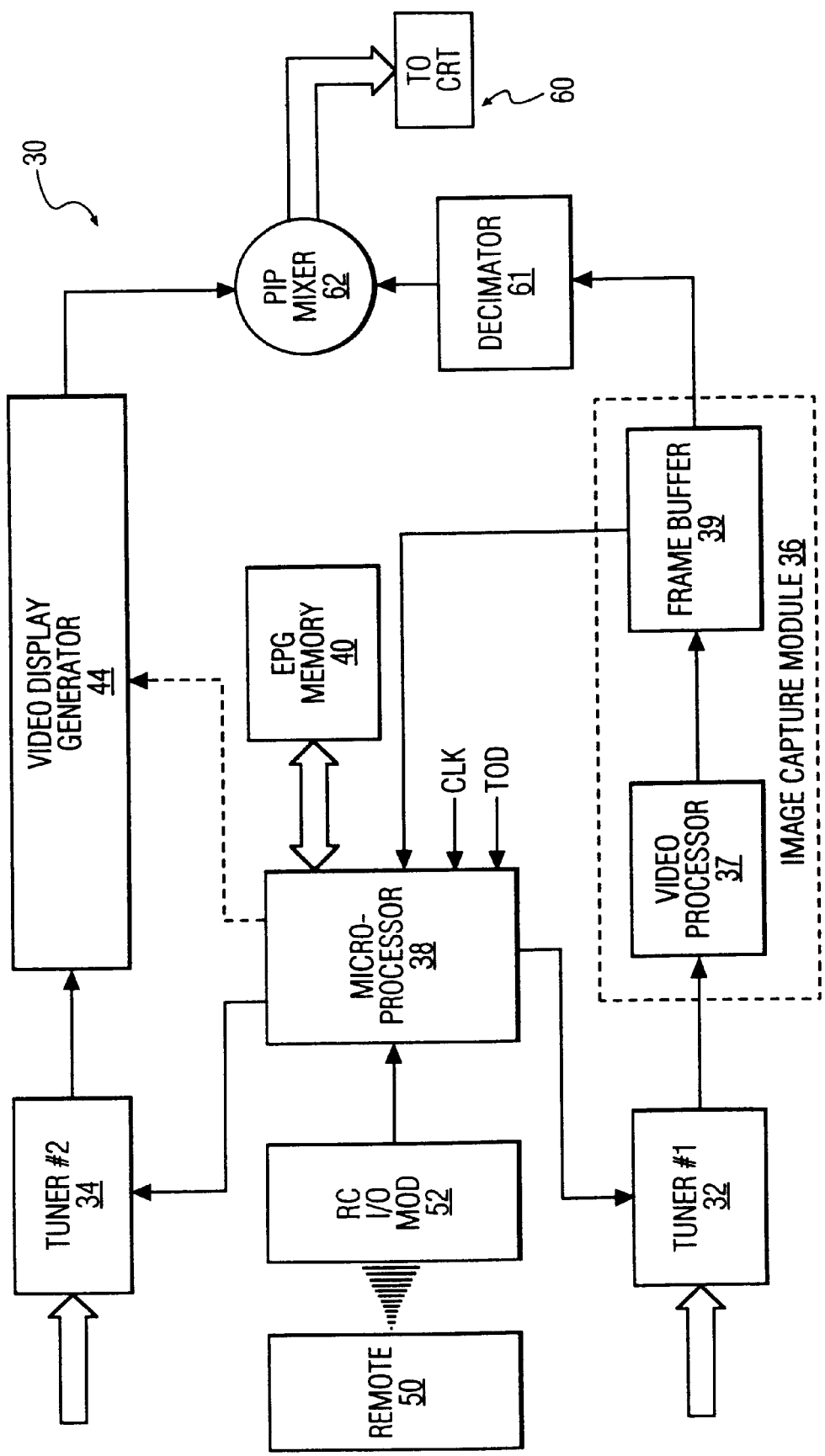
FIG. 2 is a functional block diagram of an apparatus constructed in accordance with an exemplary embodiment of the present invention; and, FIG. 3 depicts an exemplary television display produced by the method and apparatus of an exemplary embodiment of the present invention.

With reference now to FIG. 2, there can be seen a functional block diagram of an exemplary apparatus 30 for implementing the method of the present invention. Physically, the different components of this apparatus 30 can be located in a cable television set-top box, satellite receiver, PC equipped with a tuner card, or any other suitable signal reception or processing device. Alternatively, these components can be incorporated into a separate housing, or included as part of the television receiver, VCR, or multimedia playback device, or reside as a distributed application in a broadband network architecture. In general, those having ordinary skill in the pertinent art will recognize many different variations, modifications, and equivalents of the apparatus for implementing the method of the present invention, and the claims appended hereto are intended to encompass all such variations, modifications, and equivalents of the apparatus 30 for implementing the method of the present invention. Also, it should be understood that the term "broadcast" as used hereinthroughout is intended in its broadest sense to mean the transmission ("casting") of a signal over any medium to a multiple ("broad") number of receivers, and is not limited to signal transmissions over any particular medium, e.g., air, cable, satellite, etc.

With continuing reference to FIG. 2, the exemplary apparatus 30 includes a first tuner 32 and a second tuner 34. In this regard, two separate tuners are typically found in Picture-In-Picture (PIP)-equipped televisions. In general, the first tuner 32 is regularly or periodically tuned to the EPG channel, and the second tuner 34 is the primary tuner that is used to tune to the channels selected by the viewer. The apparatus 30 further includes an image capture module 36 that captures (e.g., to an image buffer contained within the image capture module 36) an image of the slow-scrolling EPG data from the broadcast EPG video signal received by the first tuner 32 and supplied thereby to the image capture module 36. A specific image capture method, including a system set-up or training routine, will be described hereinafter. In short, the captured image of the slow-scrolling EPG data constitutes a digital representation of the channel, program title, and program schedule data (i.e., "EPG data") contained in the EPG video display that would be seen by a viewer tuned to the EPG channel. The image capture module 36 transmits the captured EPG data to a data processor 38, e.g., a programmable microcontroller, microprocessor, or other type of data processor. The data processor 38 can conveniently be the system microprocessor that resides in the television receiver or the set-top box. In the following discussion, the data processor 38 will be described as a microprocessor, although it should be understood that this is not limiting to the present invention. In this connection, the term "microprocessor" as used hereinthroughout is intended to encompass any type of data processor, e.g., a microcontroller, DSP, etc.

The microprocessor 38 is programmed to execute an EPG data extraction routine to be described hereinafter in order to extract the different types of data, e.g., channel numbers and/or station IDs, program titles (and/or other program descriptors), and scheduled start (and/or end) times for each program, from the captured EPG data received from the image capture module 36, and to then store the extracted EPG data in an appropriately organized manner in a local memory 40, e.g., a DRAM. For example, the extracted EPG data can be organized in such a manner that all of the pertinent programming information for each available channel is stored in respective, separately addressable pages or blocks (e.g., contiguous storage locations) within the local memory 40. For example, a separate EPG file or record can be stored and maintained for each available channel, and the channel number of the channel currently selected by the user/viewer can be used to address or look-up the file or record stored in the local memory 40 for that channel. In this regard, the EPG data can be organized into an EPG database such as the one described in the '892 patent, although this is not limiting to the present invention.

The microprocessor 38 also receives a system clock (CLK) or a clock derived therefrom, and a Time-Of-Day (TOD) signal at respective inputs thereof. In general, the microprocessor 38 is programmed to continuously, regularly, or periodically (e.g., every hour) apply a control signal to the first tuner 32 to switch the first tuner 32 to the EPG channel, and further, to at least periodically apply a control signal to the image capture module 36 to thereby instruct the image capture module 36 to periodically (e.g., every hour) capture an image of the current EPG data from the broadcast EPG video signal, and to then transmit the thusly updated (captured) EPG data to the microprocessor 38. The microprocessor 38 then replaces the previously stored EPG data in the local (EPG) memory 40 with the updated EPG data. In this manner, the EPG data stored in the EPG memory 40 is periodically updated so that it always remains current, i.e., contains the EPG data for a specified time window. Preferably, the EPG data is updated at the same rate that the slow-scrolling EPG data contained in the broadcast EPG video signal is updated, although this is not limiting to the present invention. It will be appreciated by those having ordinary skill in the pertinent art that the user/viewer typically has the option of selecting which tuner is used to for tuning into the main or primary picture, and which tuner is used for tuning into the secondary picture, e.g., using a "SWAP" key on the remote controller when in the PIP mode of operation. As such, it should be readily evident that either the first tuner 32 or the second tuner 34 could be used to tune to the EPG channel for purposes of extracting the EPG data therefrom, e.g., if the first tuner 32 is being used as the "primary" tuner at a time that a periodic update is attempted, then the second tuner 34 can be used to tune to the EPG channel at that time instead of the first tuner 32. In this regard, the labels "first tuner" and "second tuner" as used hereinthroughout are not limited to an embodiment in which the first and second tuners are permanently designated (or immutably dedicated for use) as such, i.e., these labels are intended to encompass embodiments in which the two tuners of PIP system are interchangeably used, at different times, as the "first" and "second" tuners of the present invention.

It will be appreciated by those of ordinary skill in the pertinent art that the image capture module 36 typically includes a video processor 37 and a frame buffer 39. The video processor 37 digitizes the received video signal, and then stores each frame of the digitized video signal in the frame buffer 39. It will also be appreciated by those of ordinary skill in the pertinent art that the EPG memory 40 can be existing system memory, e.g., available RAM memory space within the microprocessor 38. Whether existing or separate memory is used for implementing the EPG memory 40 is not limiting to the present invention.

The apparatus 30 of the exemplary embodiment depicted in FIG. 2 further includes a video display generator 44 that receives at a first input EPG data supplied by the microprocessor 38 and at a second input the program video signal carried on the channel currently selected by the second tuner 34 (i.e., the channel currently selected by the user/viewer). The video display generator 44 functions to combine the EPG data received from the microprocessor 38 over the program video signal (e.g., an NTSC composite video signal) received from the second tuner 34, and to supply the combined signal to the television display device 60 (e.g., a conventional Cathode Ray Tube (CRT) device), to thereby overlay the EPG data pertinent to the selected channel over the program video signal for the selected channel. The video display generator 44 can suitably be the same or similar to the video display generator disclosed in the '892 patent (designated as element "23" in the '892 patent).

It will be appreciated by those having ordinary skill in the pertinent art that the apparatus 30 can be operated or controlled in response to user/viewer commands entered by the viewer through a remote controller 50 or other suitable device. The remote controller 50 is suitably of conventional design, and operates on conventional principles of remote control transmitter-receiver logic, such as by infrared (IR) RC5 protocol commands, radio frequency (RF), or other signaling techniques, and communicates with the apparatus 30 via a suitable remote controller interface module 52 that receives control signals (e.g., IR control signals) from the remote controller 50 and interprets or translates the received control signals, and then transmits the translated control signals (e.g., commands) to the appropriate logic elements within the television receiver and/or set-top box, including the microprocessor 38, as required. In the following discussion, the entire television set and/or set-top box, including the apparatus 30, will be collectively referred to as the "television system" for ease of discussion.

The operation of the apparatus 30 to implement the method of the present invention will now be described. As an initial matter, in order to train or set-up the apparatus 30 to recognize the format and location of the different "data fields" or "data types" included in the slow-scrolling EPG data from the broadcast EPG video signal, the viewer selects the MENU mode by depressing the MENU key (not shown) or other suitable key or button on the remote controller 50. The system, in response to this user-selection, then displays the MENU including a number of MENU options or "sub-menus", one of which is an "EPG display set-up" sub-menu.

The viewer then selects the "EPG display set-up" sub-menu, e.g., by using the directional arrow keys on the remote controller 50 to highlight the sub-menu entitled "EPG display set-up", and then depressing the ENTER or other appropriate key on the remote controller 50. The system then displays the selected "EPG display set-up" sub-menu, which then prompts the viewer to follow the following instructions and to enter the appropriate responses upon request:

a) The viewer is prompted to select the EPG channel (e.g., channel 3). In response, the viewer uses the remote controller 50 to enter the appropriate channel number, and to then switch to that channel. After switching to the EPG channel, the viewer will see a slow-scrolling EPG video display, e.g., like the one shown in FIG. 1. Often, there is more than one EPG channel, (e.g., channels 3, 60, 70, 80, and other unused "premium" service channels, or the like), so that a list of available EPG channels can be specified, whereby the system can first switch to any selected one of these available EPG channels, and if unsuccessful, switch to an alternate one of these available EPG channels, as required, as a back-up.

b) The viewer is then prompted to highlight, e.g., using the directional arrow keys on the remote controller 50, the area of the EPG video display where the channel numbers (and/or station IDs) are located. The system then makes note of the location where the channel numbers (and/or station IDs) are located.

c) The viewer is then prompted to highlight, e.g., using the directional arrow keys on the remote controller 50, the area of the EPG video display where the times are located. The system then makes note of the location where the times are located.

d) The viewer is then prompted to highlight, e.g., using the directional arrow keys on the remote controller 50, the area of the EPG video display where the program titles (and/or other descriptors) are located. The system then makes note of the location where the program titles (and/or other descriptors) are located. Alternatively, the viewer can be prompted to highlight each program title individually, a row at a time, or in any other suitable manner.

The above-described system "EPG display set-up" routine can be thought of as a system set-up/training or "EPG display format recognition" routine, in that it enables the system (e.g., the image capture module 36 and/or the microprocessor 38) to "learn" from the viewer responses the location of each different "EPG data type" or "EPG data field" within the slow-scrolling EPG video display. However, it will be appreciated by those having ordinary skill in the art that this routine can be alternatively performed automatically by the system without the need for user participation, e.g., by means of a format recognition algorithm implemented in software running on the microprocessor 38 and/or other programmable processor within the system. This is easily done because in most cases the EPG data is presented as a data "grid", e.g., with times and channels each on a different axis, e.g., times or channels on the vertical axis, and channels or times on the horizontal axis.

For example, the microprocessor 38 can be programmed to tune the first tuner 32 to the EPG channel (e.g., upon initial system set-up); then to command the image capture module 36 to capture an image of the slow-scrolling EPG data from the broadcast EPG video signal received by the first tuner 32; and, then to analyze the captured EPG data to determine the location of the different EPG data fields within the captured image, in accordance with a suitable image data analysis and recognition algorithm.

For example, all channel numbers and/or stations IDs, regardless of the specific EPG display format, will be comprised of from one to three consecutive digits and/or a string of three to five capital letters; all times will include one or two digits followed by a colon that is followed by two digits (and, usually, an AM or PM designator); and, all program titles (and/or program descriptors) will be comprised (at least primarily) of alphabetic characters. Thus, the captured image can be analyzed to identify where each data type is located based on these criteria, and then the respective locations of each data type or data field can be recorded in an appropriate storage location(s) within the system memory or in any other suitable storage location (e.g., within the microprocessor 38).

In any event, after the system is thus set-up to recognize the EPG display format and the relative location of each data field within the EPG display, the system is ready to be operated in a manner that fully implements the method of the present invention. More particularly, in operation, the microprocessor 38 is programmed to periodically (e.g., every hour or two hours) cause the image capture module 36, in the manner described hereinabove, to capture the image of the current EPG data from the broadcast EPG video signal received by the first tuner 32, and to then supply the captured EPG data to the microprocessor 38. It should be appreciated that the present invention is not limited to capturing (or updating) the EPG data at fixed "periodic" intervals, but rather, the "periodic" intervals can be "variable", e.g., the microprocessor 38 can determine the latest time (LT) to which the currently-stored EPG data pertains, and then, using a programmable timer (implemented in hardware or software) clocked by the system clock CLK, and/or by comparing the current TOD with the LT, the microprocessor 38 can recognize when the end of the EPG data time range is nearing (e.g., within a user-selectable time interval from the end-of-time range, such as thirty minutes or one hour), and then either automatically command an EPG image capture or prompt the user/viewer to invoke this function at such time(s).

Then, the microprocessor 38 executes an EPG data extraction routine, whereby the microprocessor 38, based on the information gathered from the format recognition/set-up routine, identifies and extracts from the captured EPG data the program title for each channel number for the current TOD, and then stores the program title (and, if desired, additional information such as additional program descriptors (e.g., type and/or rating of the current program, such as "MOVIE:PG-13"), icons, logos, watermarks, start and/or stop times for the current program, channel number and/or station ID, etc.) for the program currently running on each available channel in respective, separately addressable pages or blocks (e.g., contiguous storage locations) within the local memory 40.

Figures 1, 3:
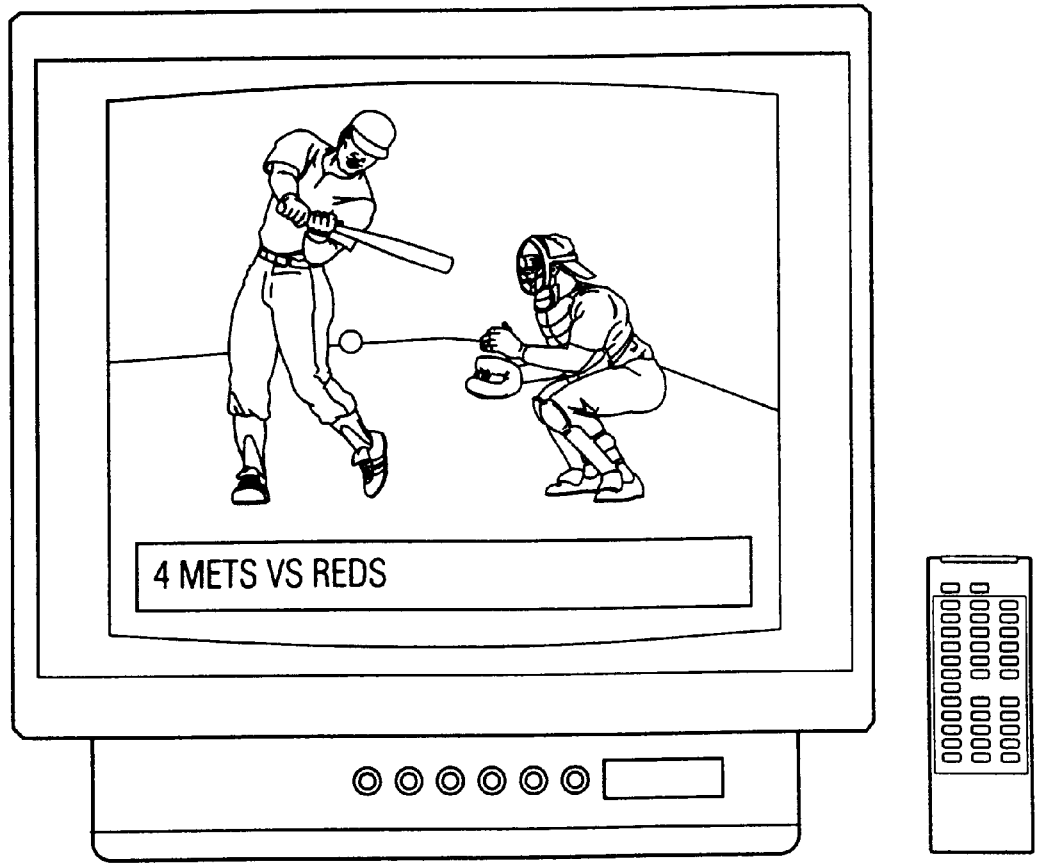
FIG. 1 depicts a typical EPG display format.

Then, every time the user/viewer changes channels, the program title (and other information, if desired) stored in the local memory 40 for the selected "new" channel is retrieved from the local memory 40, supplied to the video display generator 44, and then displayed on a predetermined portion (e.g., the bottom) of the television screen in overlaying relationship to the program video signal, e.g., as illustrated in FIG. 3. Of course, the system can be designed to automatically invoke this functionality, e.g., as a system default mode. Alternatively, the system can be designed to require the user/viewer to invoke this functionality, e.g., by invoking a special "EPG display mode" of operation as a MENU or sub-menu option, such as the "FLIP" and/or "BROWSE" modes of operation disclosed in the previously-referenced '892 patent.

Further, the system can be designed to allow the user to selectively vary the size and/or location of the program title display, e.g., as a MENU or sub-menu option, such as "VIEWER PREFERENCES—EPG DISPLAY", and/or to selectively vary the type of programming information to be displayed (e.g., program title only, program title +channel number, etc.) and/or to selectively vary the presentation format of this programming information and/or to selectively edit the programming information (e.g., to "fit" within the selected display area).

It should be clearly understood that the terminology "programming information" as used hereinthroughout is intended to mean information that identifies either the program currently being viewed and/or a program(s) scheduled to be run in a future time period (e.g., a 2 to 4 hour time period) on a selected channel, including at least the program title(s), but not necessarily any information other than the program title(s). Further, the microprocessor 38 can be programmed to cause the programming information to be displayed for either a fixed or user-selectable variable period of time (e.g., 5 to 60 seconds) sufficient to enable the viewer to read the programming information.

It should also be noted that the system can also be designed to implement a "BROWSE" mode of operation such as the one described in the '892 patent, whereby the viewer is provided with the ability to scan through program schedule information for any channel, including, but not limited to, the channel being viewed, while at the same time continuing to view the TV program previously selected.

With reference again to FIG. 2, additional components that are typically included within a PIP-equipped television system will now be described. More particularly, these additional components include a decimator 61 that decimates each frame of the video signal stored in the frame buffer 39 to enable the "secondary" picture (i.e., the smaller picture within the larger picture) to be dimensioned to the appropriate size for display in overlaying relationship to the "primary" picture. The thusly-decimated "secondary" picture is then supplied to a first input of a PIP mixer 62 that receives at a second input the video signal supplied by the video display generator 44. The output of the PIP mixer 62 is the video signal actually applied to the CRT 60 for display to the television viewer. It will be readily appreciated that when the viewer invokes the PIP mode of operation, the output of the video display generator 44 will be the "primary picture" (i.e., the broadcast video signal carried on the selected channel tuned to by the second tuner 34), and the output of the decimator 61 will be the appropriately-dimensioned "secondary picture" (i.e., the decimated version of the broadcast video signal carried on another selected channel tuned to by the first tuner 32, in the PIP mode of operation of the television system).

In an alternative embodiment of the present invention, rather than the microprocessor 38 being programmed to execute the EPG data extraction routine described hereinabove, the captured image of the slow-scrolling EPG data from the broadcast EPG video signal received by the first tuner 32 is stored directly in the EPG memory 40, e.g., as a bitmap, and the microprocessor 38 is programmed to executes a "matching" algorithm, whereby the bitmap is searched for the number and/or station ID of the channel selected by the viewer. Upon detection of a "match", the adjacently stored programming information for the current time is retrieved and displayed as in the previously described embodiment of the present invention. For example, based upon the information learned in the EPG format recognition routine (i.e., the setup/training session), the location of the program title corresponding to the current time can be determined, and then the program title can be retrieved from that location. In this connection, the first program title entry that is located immediately adjacent to the channel number of interest is typically the program title entry for the current time-of-day (TOD).

Although presently preferred and exemplary embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

For example, the present invention has been described hereinabove in connection with various embodiments in which the apparatus that performs each step of the method of the present invention is incorporated into the television receiver and/or set-top box. However, alternative embodiments of the present invention in which one or more of the steps of the method of the present invention are performed externally of the television set and/or set-top box are possible. For example, the apparatus 30 can be designed to capture the image of the broadcast video signal that includes the EPG data and to then transmit the captured image to an "external" device such as a laptop computer, a Personal Digital Assistant (PDA—such as the NINO sold by Philips Electronics), an intelligent remote controller (such as the PRONTO sold by Philips Electronics), or any other device that is adapted to receive this information, and that is equipped with a display (e.g., an LCD display) to display at least selected portions of this information. The Philips PRONTO remote controller is believed to be particularly suitable for this application since it includes a touch-screen display, both receive and transmit IR ports, a programmable processor, and a recharging/communications dock.

The external device can be programmed to extract programming information from the captured image, to store the extracted programming information, to selectively retrieve the stored programming information, and to display the retrieved programming information. Alternatively, the apparatus 30 can be programmed to extract programming information from the captured image, and to then transmit the extracted programming information (either without storing it, or after storing it) to the external device, e.g., via an IR link, an IEEE 1394 ("firewire") wireless (or wired) link, an RF link, a serial RS-232 link, or any other convenient transmission medium. The external device can be adapted to store, retrieve and display or to just display the received programming information transmitted by the apparatus 30. Further, the television system can be designed so that the programming information is displayed on the television screen as in the embodiments described hereinabove, and is additionally displayed on the display of the external device (or is displayed on either one, at the user's selection), as opposed to being exclusively displayed on only the display of the external device.

Of course, many variations and/or modifications of any of these systems designs and architectures will become readily apparent to those of ordinary skill in the pertinent art, and are intended to be encompassed by the appended claims.

What is claimed is:

1. A television system, comprising:
   a first tuner;
   a second tuner for receiving a program video signal carried on a channel selected by a viewer;

a microprocessor;

an image capture module having an input coupled to an output of the first tuner and an output coupled to an output of the microprocessor; and a video display generator having a first input coupled to an output of the second tuner and a second input coupled to an output of the microprocessor;

wherein the microprocessor is programmed to at least periodically tune the first tuner to an EPG channel carrying a broad cast video signal that includes EPG data, and to periodically control the image capture module to capture an image of the broadcast video signal that includes EPG data;

wherein the microprocessor is also programmed to at least periodically extract programming information from the captured image, and to store the extracted programming information;

wherein the microprocessor is also programmed to retrieve at least selected portions of the stored programming information, and to supply the retrieved programming information to the video display generator, whereby the video display generator simultaneously displays both a current program carried on the selected channel and the retrieved programming information on a video display;

wherein the television system is programmed to perform a set-up routine that trains the microprocessor to recognize a presentation format of the EPG data contained in the broadcast video signal received over the EPG channel; and wherein the television system is programmed to perform a set-up routine that trains the microprocessor to recognize the locations of different data fields of the EPG data contained in the broadcast video signal received over the EPG channel, whereby the microprocessor uses this location information in extracting the programming information from the captured image.

2. The television system as set forth in claim 1, wherein the retrieved programming information includes at least a program title that identifies the current program being carried on the selected channel.

* * * * *